Jan. 14, 1958     H. E. SLOAN     2,819,906
COLLET CHUCK
Filed Oct. 21, 1953     6 Sheets-Sheet 1
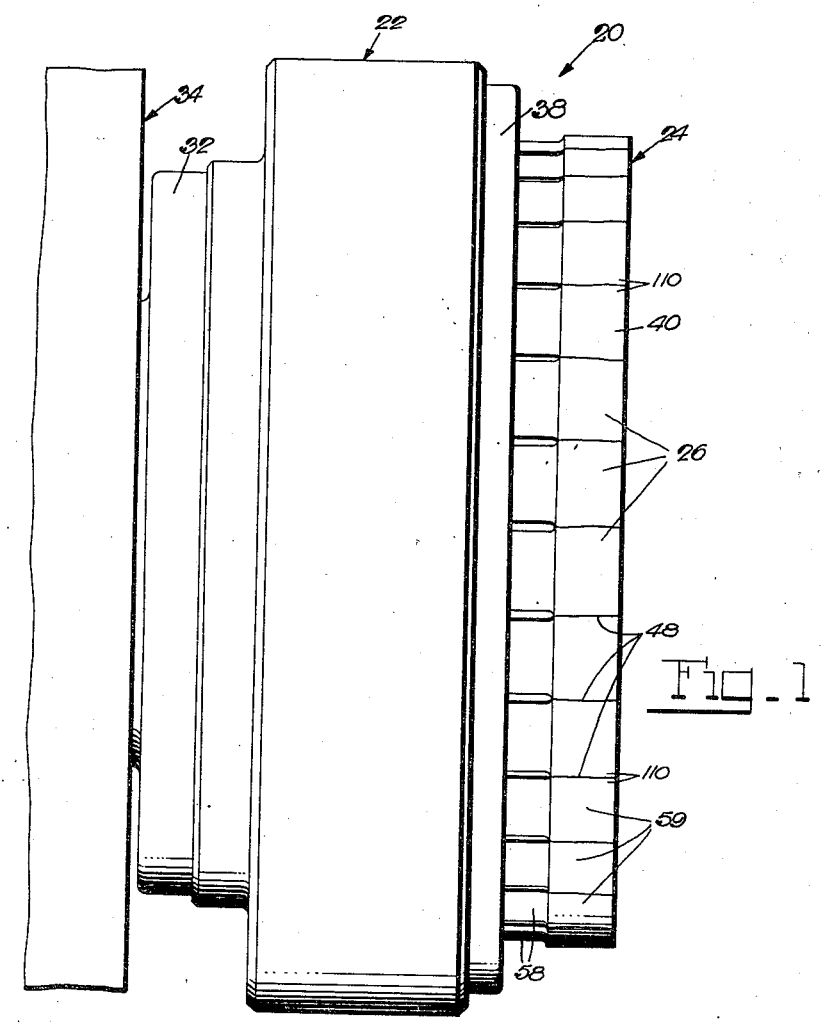
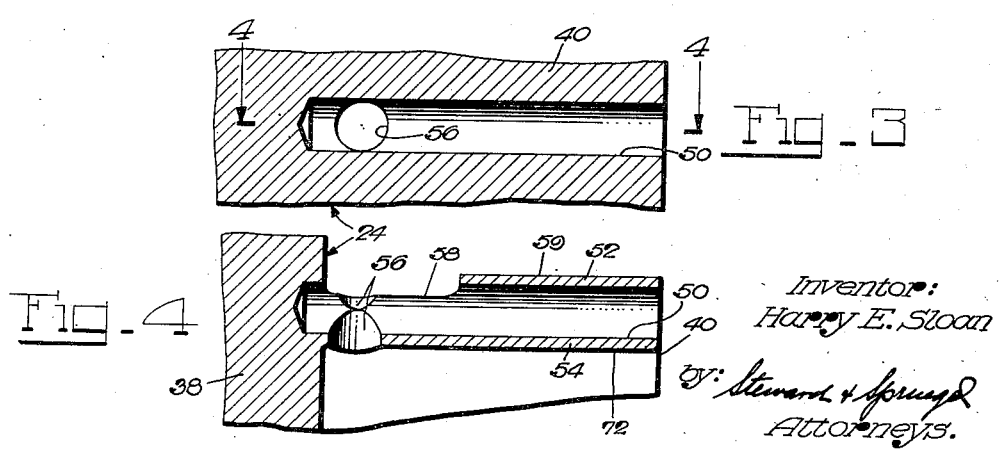
Inventor:
Harry E. Sloan
by: Steward + Spring
Attorneys.

Jan. 14, 1958
H. E. SLOAN
2,819,906
COLLET CHUCK
Filed Oct. 21, 1953
6 Sheets-Sheet 2
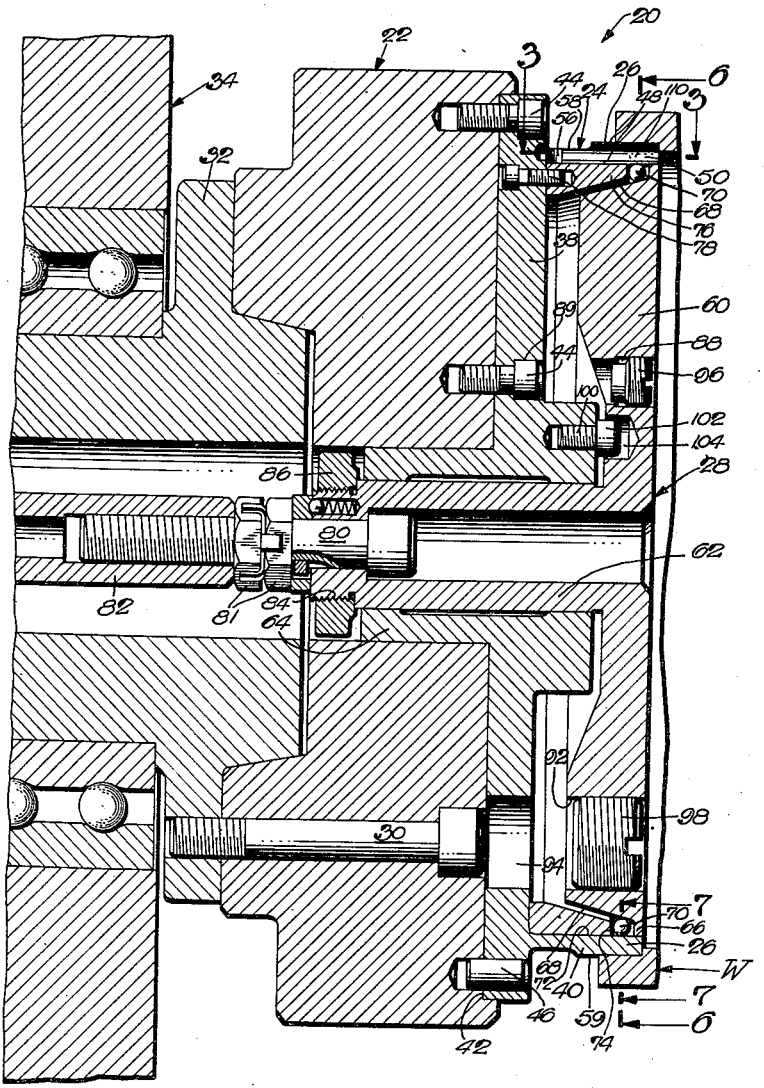
Fig_2
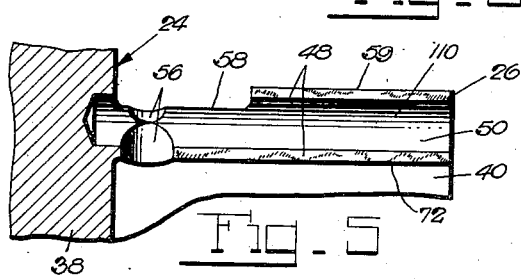
Fig_5
Inventor:
Harry E. Sloan
By: Steward & Sprugel
Attorneys.

Jan. 14, 1958
H. E. SLOAN
2,819,906
COLLET CHUCK
Filed Oct. 21, 1953
6 Sheets-Sheet 4
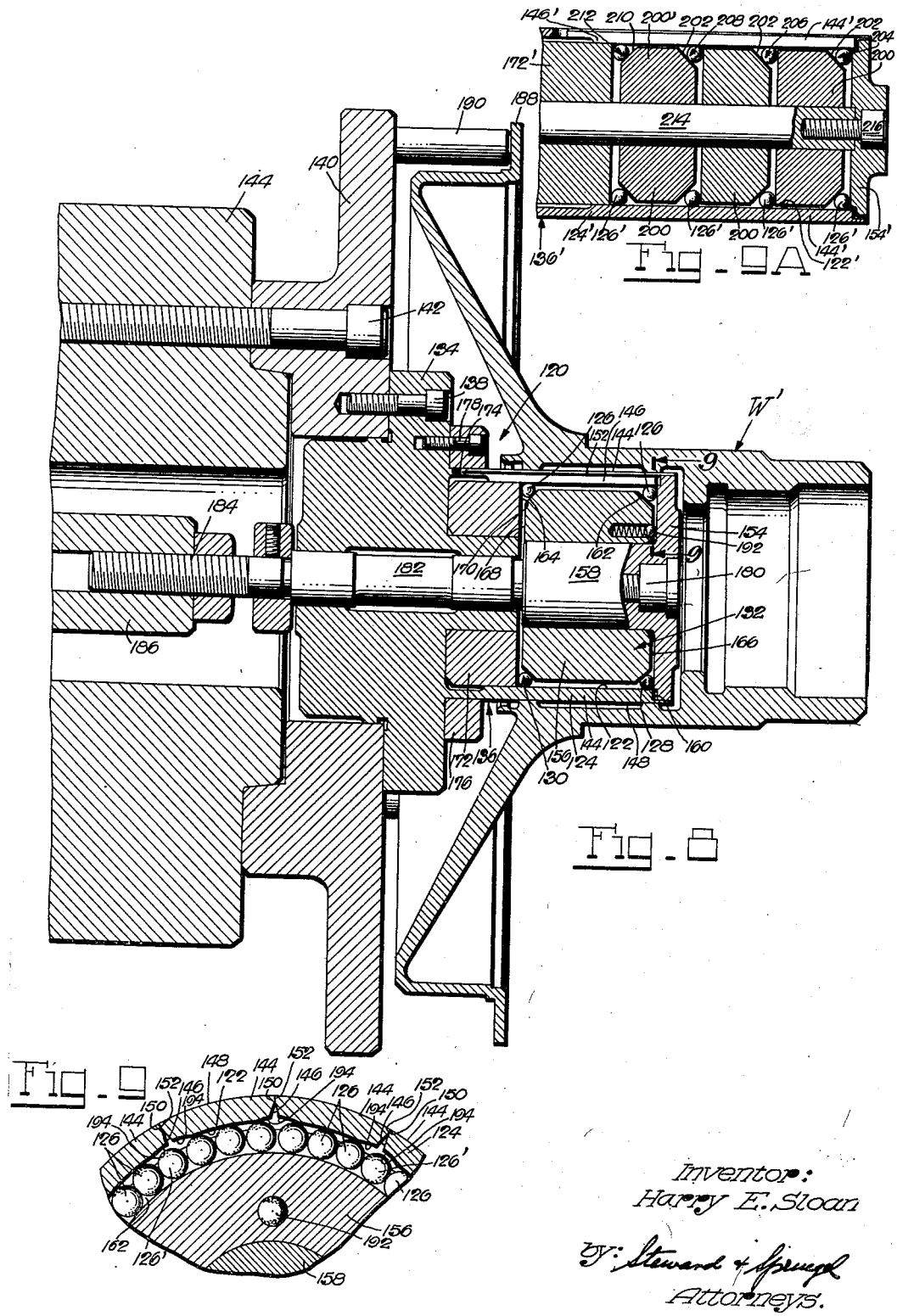
Inventor:
Harry E. Sloan
By: Steward & Spruegel
Attorneys.

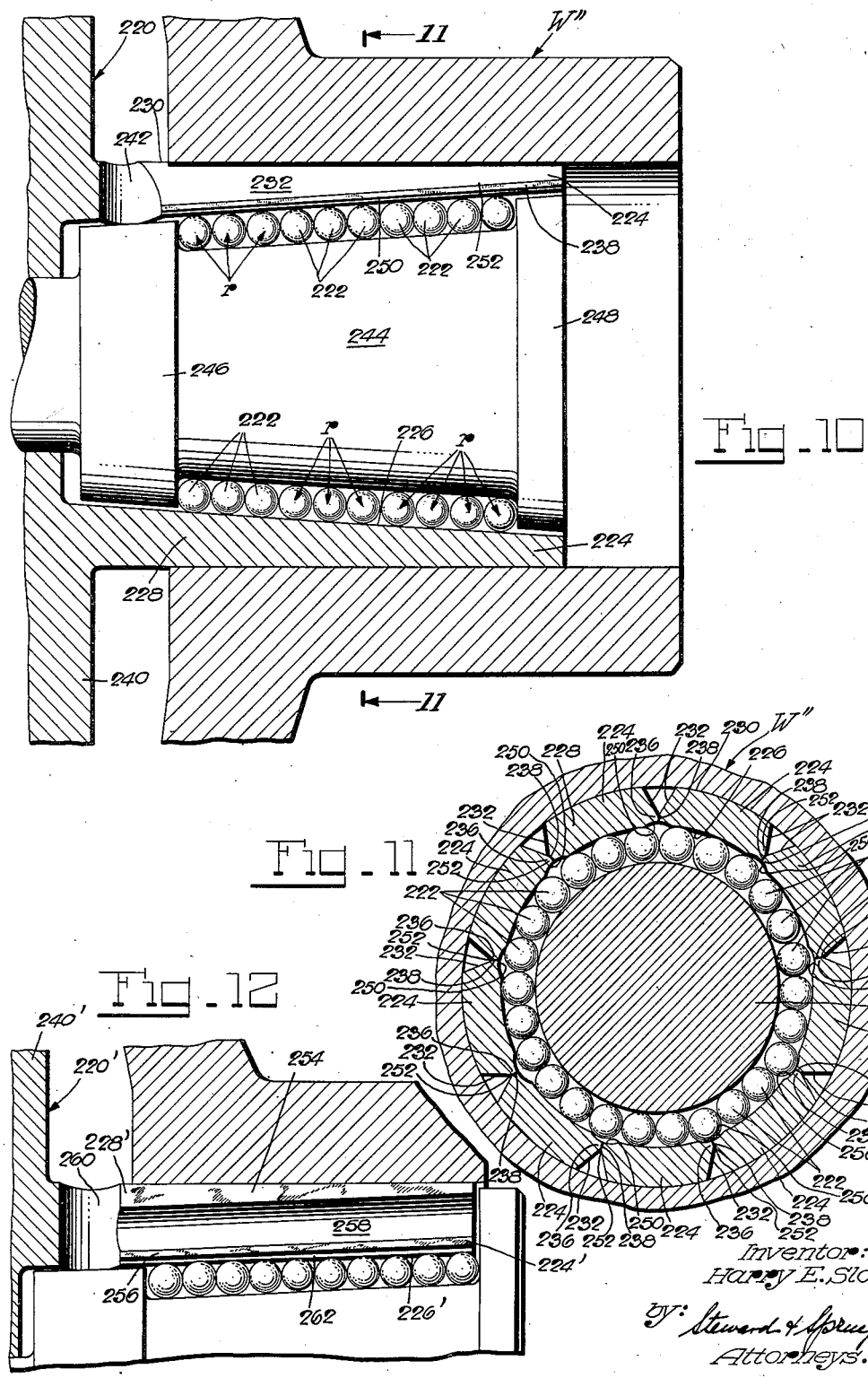

Jan. 14, 1958     H. E. SLOAN     2,819,906
COLLET CHUCK
Filed Oct. 21, 1953     6 Sheets-Sheet 6
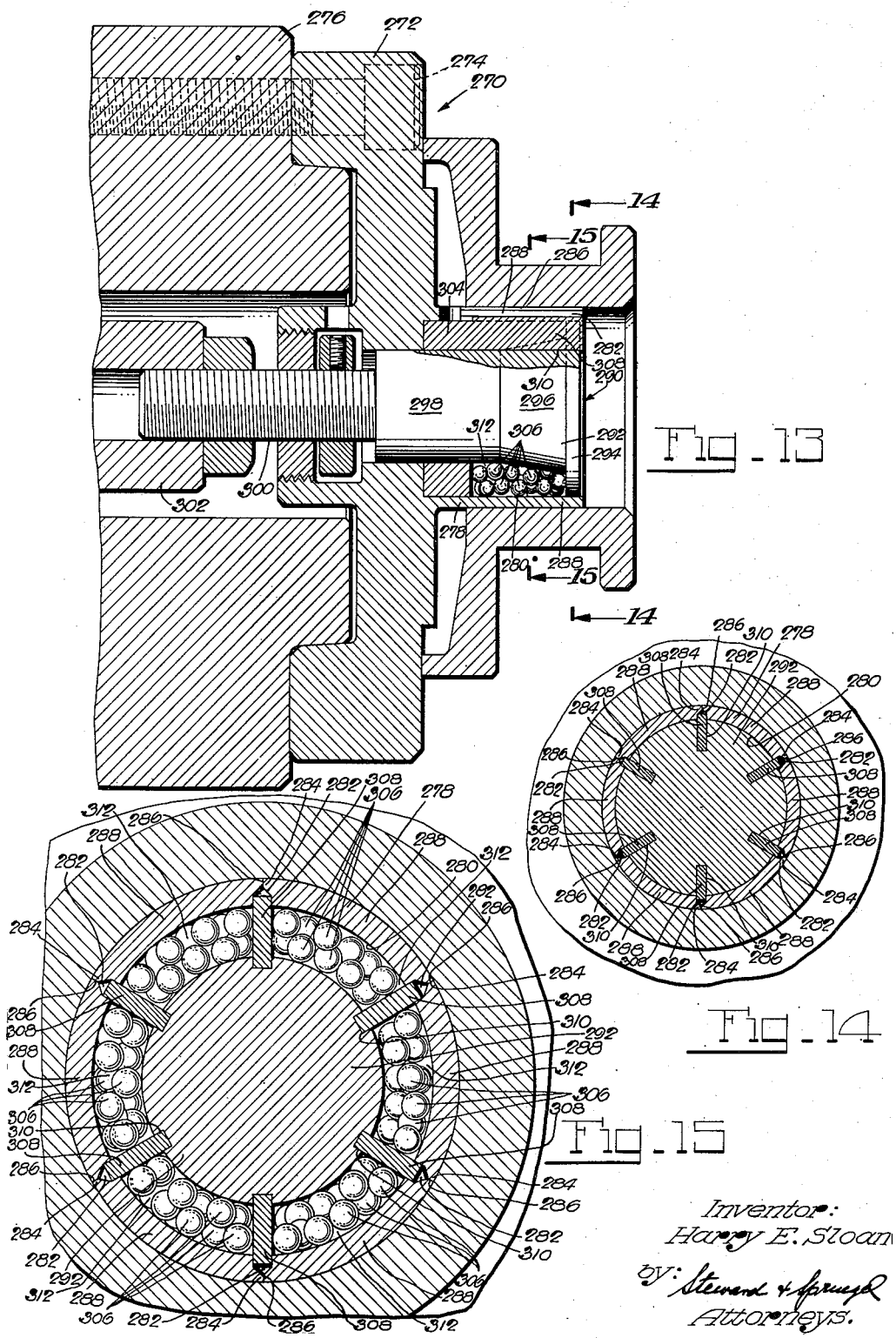

United States Patent Office 2,819,906
Patented Jan. 14, 1958

2,819,906

COLLET CHUCK

Harry E. Sloan, Hartford, Conn., assignor to The Cushman Chuck Company, Hartford, Conn., a corporation of Connecticut Application October 21, 1953, Serial No. 387,341

13 Claims. (Cl. 279—2)

This invention relates to work-holding chucks in general, and to collet chucks in particular.

The type of collet chuck with which the present invention is generally concerned is shown and described in my copending application Serial No. 242,813, filed August 21, 1951, now Patent No. 2,759,733. This previous chuck is characterized by a collet of which a tubular wall portion is divided by longitudinal gapless cracks therein into work-gripping jaws which in their non-expanded condition are in abutting engagement with each other. The jaws are expanded into gripping engagement with work on axial movement of an internal frusto-conical expander which outwardly forces a mass of steel balls that are confined in the tubular collet wall and interposed between the latter and the internal expander. In order to achieve, in the manufacture of the collet, the formation of jaws of predetermined geometrical outlines by the aforementioned cracks in the tubular collet wall, the cracks are directed along substantially rectilinear lines by weakening the tubular collet wall thereat prior to cracking. Weakening of the tubular wall of the collet along the desired lines of the cracks to be formed is achieved by longitudinally recessing the collet wall thereat, thereby reducing the wall thickness of the same on opposite sides of each recess to such an extent that the tubular collet wall will subsequently crack on the inside and outside substantially along the desired lines on being tapped or otherwise subjected to cracking stresses thereat. However, the aforementioned recessing of the tubular wall of the collet for its controlled cracking leaves the same relatively thin in the immediate vicinity of the inner and outer cracks, with the result that a part or parts of the wall along any of the inner cracks may readily break off under the outward pressure from the adjacent steel balls when the jaws are expanded into gripping engagement with work. Accordingly, this previous collet chuck, while highly advantageous in many respects, is not fracture-proof. Needless to say, any jaw thus partly broken away at either one of its sides could seriously interfere with the proper performance of the collet, and could even render the same unfit for further use if one or more of the steel balls were to wedge their way between adjacent jaws.

It is among the important objects of the present invention to provide a collet chuck of the aforementioned construction which will never malfunction or become damaged from the exertion of gripping pressure of even exceptional magnitude by its jaws on work.

It is another important object of the present invention to provide a collet chuck of this type but of an alternative construction, which is assuredly unimpaired in its performance by the internal steel balls in the collet if the cracks extend only from the outer surface of the tubular collet wall part-way thereinto and lead into grooves in the inner surface thereof which in this alternative construction are provided in order to obviate any weakening wall reduction of the jaws at their opposite sides.

It is a further object of the present invention to provide a collet chuck of this type in the alternative constructions of which the steel balls are, on operation of the internal expander, effectively held out of pressure transmitting relation either with the reduced wall portions of the tubular collet wall along the aforementioned inner cracks therein in one construction, or with the aforementioned grooves in the inner surface of the collet wall in the other construction, but they are in either construction admitted into pressure-transmitting relation with the remaining collet wall and exert most uniform outward pressure thereon for even expansion of the jaws into gripping engagement with work, thereby assuredly precluding breakoff of any part or parts of any jaw from internal pressure in one construction, and the wedging of any steel ball or balls into any of the grooves in the inner surface of the collet in the other construction.

Another object of the present invention is to provide a fracture-proof collet chuck of the aforementioned inner crack construction of which the inner surface of the tubular wall of the collet is along each inner crack therein provided with a depression, and only a single layer of steel balls is interposed between the inner surface of the collet wall and the internal expander, so that on operation of the latter most of the steel balls will uniformly expand the jaws into gripping engagement with work, but the remaining balls adjacent the depressions will have sufficient play between the latter and the expander to prevent any pressure transmission by them to the jaws even if the depressions are very shallow.

It is a further object of the present invention to provide a fracture-proof collet chuck of the aforementioned inner crack construction of which the inner surface of the tubular wall of the collet may, for most facile and easiest controlled cracking of the latter for the jaw formation, remain cylindrical despite the aforementioned single layer of steel balls between collet and expander, by arranging the steel balls in a single row around the expander and confining them so that they may move only outwardly and inwardly under the control of the expander.

Another object of the present invention is to provide a fracture-proof collet chuck of the aforementioned inner crack construction of which the jaws may, despite the aforementioned cylindrical inner surface of the tubular wall of the collet for most facile and easiest controlled cracking of the latter for the jaw formation, be expanded by steel balls at longitudinally spaced places thereof for their greater gripping action on a larger work area, by arranging the steel balls in several spaced single rows around the expansion mechanism and providing the latter with spaced frusto-conical surfaces for cooperation with the respective ball rows.

It is a further object of the present invention to provide a fracture-proof collet chuck of the aforementioned inner crack construction of which the inner surface of the tubular wall of the collet is frusto-conical for interposition between the same and the internal frusto-conical expander of side-by-side arranged single rows of steel balls which, on operation of the expander, will expand the jaws with a maximum force into gripping engagement with work.

It is another object of the present invention to provide a fracture-proof collet chuck of the aforementioned inner crack construction and with the aforementioned side-by-side arranged single rows of steel balls, of which the tubular wall of the collet is, for the formation of the jaws, cracked in a readily controlled manner by simply machining into the outer periphery of the tubular collet wall along the lines of the intended cracks preferably V-shaped grooves of such gradually varying depths that the wall thicknesses to-be-cracked between the apices of these grooves and the aforementioned inner frustoconical surface of the collet are uniform throughout.

A further object of the present invention is to provide a collet chuck of either of the forementioned alternative constructions in which several superposed layers of steel balls may be interposed between the inner surfaces of the jaws and the internal expander without any possible harm to the jaws or without impairing the performance of the collet in any way.

Another object of the present invention is to provide a collet chuck of the aforementioned inner groove construction and with the aforementioned superposed layers of steel balls between the inner surfaces of the jaws and the internal expander, of which the steel balls are prevented from wedging their way into the inner grooves in the collet by radial shielding ribs which are in alignment with, and extend from the internal expander outwardly into sufficiently close proximity to, these grooves to hold the steel balls away therefrom.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a side view of a collet chuck embodying the present invention;

Fig. 2 is a longitudinal section through the same collet chuck;

Fig. 3 is an enlarged fragmentary section through a part of the collet chuck as taken on the line 3—3 of Fig. 2;

Fig. 4 is a fragmentary section taken on the line 4—4 of Fig. 3, and showing a part of the collet chuck in an intermediate stage of its manufacture;

Fig. 5 is a section similar to Fig. 4, but showing the same part of the collet chuck in the final stage of its manufacture;

Fig. 8 is a longitudinal section through a collet chuck embodying the present invention in a modified manner;

Fig. 9 is an enlarged fragmentary section through a part of the modified collet chuck as taken on the line 9—9 of Fig. 8;

Fig. 9A is a fragmentary longitudinal section through a part of a collet chuck which embodies the present invention in another modified manner;

Fig. 10 is a longitudinal section through a part of a collet chuck embodying the present invention in a further modified manner;

Fig. 11 is a section taken on the line 11—11 of Fig. 10;

Fig. 12 is a fragmentary longitudinal section through a part of a collet chuck embodying the present invention in another modified manner;

Fig. 13 is a longitudinal section through a collet chuck embodying the present invention in still another modified manner;

Fig. 14 is a section taken on the line 14—14 of Fig. 13; and

Fig. 15 is an enlarged fragmentary section taken on the line 15—15 of Fig. 13.

Figure 6:
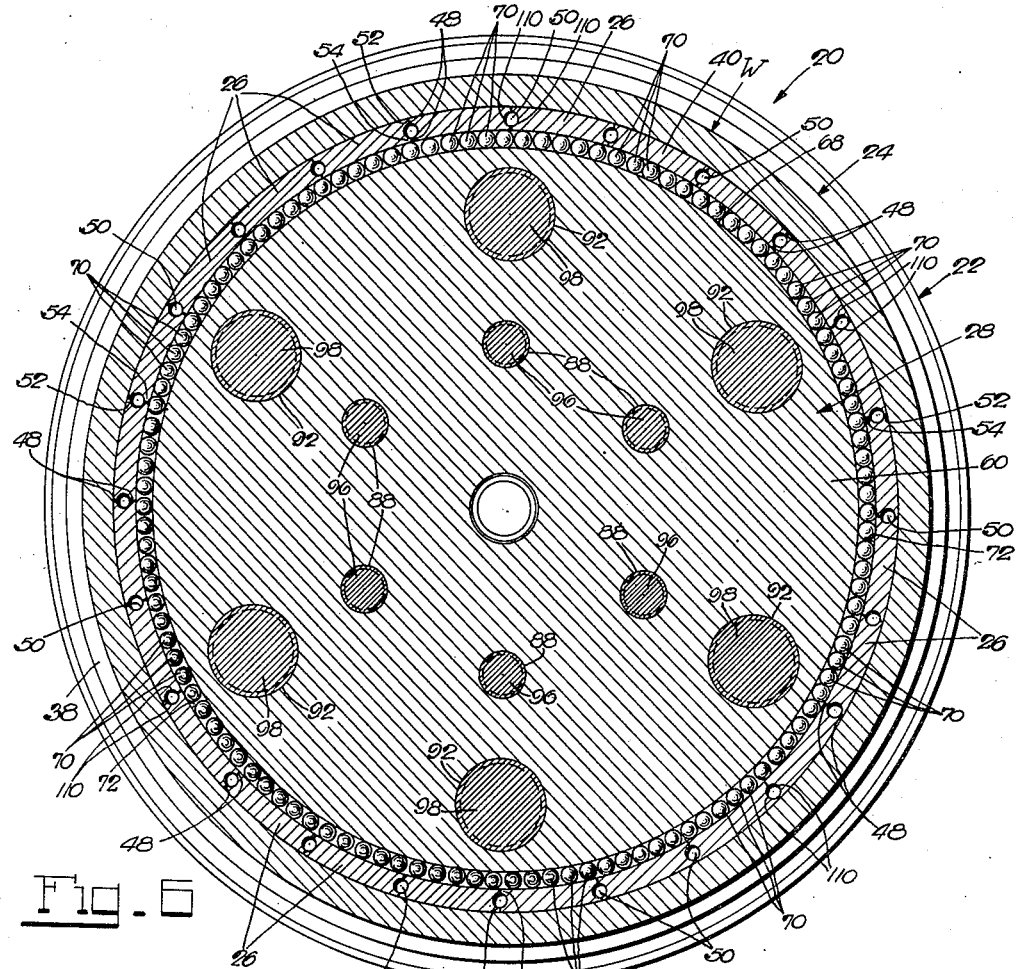
Fig. 6 is a cross-section through the collet chuck as taken on the line 6—6 of Fig. 2.
Figure 7:
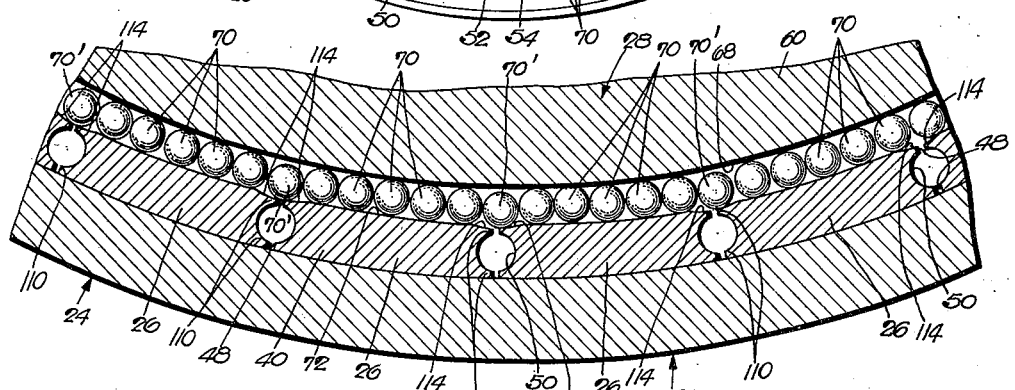
Fig. 7 is an enlarged fragmentary section through the collet chuck as taken on the line 7—7 of Fig. 2.

Referring to the drawings, and more particularly to Figs. 1 to 7 thereof, the reference numeral 20 designates a collet chuck which comprises a chuck body 22, a collet 24 with expansible jaws 26, and jaw-expansion mechanism 28 (Fig. 2). The chuck 20 may conveniently be mounted by screws 30 on the journaled power spindle 32 of a lathe or other machine tool 34.

The collet 24 has a body 38 which in this instance is in the form of a disc, and is provided with a forwardly projecting tubular wall 40. The collet 24 is received with its body 38 in an annular recess 42 in the chuck body 22 and is mounted therein by a plurality of bolts 44. One or more dowel pins 46 (Fig. 2) serve for quick angular location of the collet 24 on the chuck body 22, and also for relieving the mounting screws 44 of shear stresses when work on the driven collet is being operated upon.

The work-gripping jaws 26 of the collet 24 are formed by the tubular wall 40 thereof. To this end, the tubular wall 40 of the collet is provided with peripherally spaced longitudinal cracks 48 (Figs. 1, 2 and 6) which divide the same into the expansible jaws 26. The cracks 48, which are gapless, are equiangularly spaced from each other so that the jaws 26 are of identical widths (Figs. 1 and 6). In order to control the cracking of the tubular wall 40 of the collet so that the cracks 48 will extend substantially rectilinearly, the tubular collet wall 40 is longitudinally recessed, and preferably bored as at 50 to a uniform depth at the equiangularly spaced places at which the cracks 48 are to be formed (Figs. 3 and 6). In thus providing the longitudinal bores 50 in the tubular wall 40, the latter is on opposite sides of each bore 50 therein left with reduced wall thicknesses of minimum radial dimensions at points 52 and 54, respectively (Figs. 4 and 6). Preferably, the bores 50 are located centrally of the uniform thickness of the tubular collet wall 40 so that the reduced outer and inner wall thicknesses 52 and 54 are alike. On subsequently tapping the bored tubular collet wall 40 at its reduced wall thicknesses 52 and 54, or subjecting the same to other cracking stresses, the tubular wall 40 will readily crack thereat along substantially rectilinear lines (Figs. 1 and 5). In order further to control the cracking of the tubular collet wall 40 and prevent the spread of the cracks 48 into the collet body 38, the tubular collet wall 40 is at the inner ends of the jaws 26 provided with transverse holes or bores 56 (Figs. 3 to 5) which intersect the longitudinal bores 50 and assuredly terminate the cracks 48 thereat. The jaws 26 are, in the present instance, undercut at the rear thereof as at 58 so as to have their work-gripping surfaces 59 spaced forwardly from the collet body 38.

The expansion mechanism 28 comprises, in the present instance, an expander 60 which presently is in the form of a disc having a rearwardly extending shank 62 which is axially slidable in a central hub 64 on the collet body 38. The periphery of the expander 60 is machined to provide an end flange 66 and an axially inclined, annular surface which in this case is frusto-conical. As shown in Fig. 2, expander 60 is received within the tubular collet wall 40 so as to be encompassed thereby, thus disposing the annular inner surface 72 of the tubular collet wall adjacent the annular outer surface 68 of the expander 60. On axial movement of the expander to the left as viewed in Fig. 2, it will wedge or force a mass of steel balls 70 outward, causing the expansion of the jaws 26 into gripping engagement with work W. The steel balls 70 are, in the present instance, arranged in a single row interposed between the inner surface 72 of the tubular collet wall 40 and the frusto-conical surface 68 of the expander 60 (Figs. 2 and 6). In order that the steel balls 70 will on axial inward motion of the expander 60, be forced outwardly and expand the jaws 26, they are held against inward movement with the expander by a forward shoulder 74 on a ring member 76 which may conveniently be bolted at 78 to the collet body 38. As shown in Fig. 2, the ring member 76 is fittedly received in the tubular collet wall 40, thereby sealing the inside of the latter and preventing chips or other foreign matter from entering the collet through the transverse holes 56 therein. The end flange 66 on the expander 60 is fittedly received in the forward end of the tubular collet wall 40 and prevents chips or other foreign matter from entering the collet thereat.

For axially moving the expander 60, its shank 62 is operatively connected by a screw 80 and lock nuts 81 with a reciprocable drawbar 82 in the hollow power spindle 32. The shank 62 of the expander 60 is threaded at 84 for the reception of a nut 86 which holds the expander assembled with the rest of the collet chuck when the latter is not mounted on a lathe or other machine tool. The drawbar 82 requires only a very short motion, in one direction in order to cause the expander 60 to force the steel balls 70 outwardly for the expansion of the jaws 26 into gripping engagement with work, and in the opposite direction in order to relieve the steel balls of any outward pressure and permit the jaws to contract for the release of work therefrom and for the placement of new work thereon.

The expander 60 is in this instance provided with holes 88 (Figs. 2 and 6) through which to pass a wrench for manipulation of the normally hidden head screws 44 in the holes 89 in the body 38 of the collet 24 when the latter and the expander 60 are as an assembled unit mounted on or dismounted from the chuck body 22. The expander 60 and the collet body 38 are further provided with aligned holes 92 and 94, respectively, through which to pass a wrench for manipulation of the head screws 30 when the assembled chuck is mounted on or dismounted from the power spindle 32 of the machine tool. The holes 88 and 92 in the expander 60 are normally closed by removable plugs 96 and 98, respectively (Figs. 2 and 6). In order to keep the holes 88 and 92 in the expander 60 in alignment with the adjacent holes 89 and 94, respectively, in the collet body 38, the latter carries a screw 100 the head 102 of which registers with an aperture 104 in the expander 60 and serves as a pilot (Fig. 2).

The collet chuck described herein is in its general construction like the collet chuck shown and described in my beforementioned Patent No. 2,759,733, and differs therefrom only in one major respect in that the instant collet chuck holds only a single row of steel balls for a reason described hereinafter. However, the instant collet chuck has all the important advantages of my previous collet chuck. Thus, the interior of the collet is at all times effectively sealed against chips and other foreign matter, thereby forestalling uneven expansion of the jaws or damage to the same by reason of a foreign body or bodies in the collet. By virtue of the division of the tubular collet wall 40 into the jaws 26 by the gapless cracks 48 in the former, the jaws combine to form a normally continuous work-gripping surface which, on expansion of the jaws, affords a maximum contact area with the work thereon and permits the exertion of an optimum clamping force on the work without marking or marring the same. Further by virtue of the gapless and nearly gapless relative disposition of the jaws 26 in their contracted and expanded conditions, respectively, the collet is ideally suited for safely retaining the steel balls 70 or any other substitute flexible or resilient materials which may be used advantageously for most uniform expansion of the jaws at all times. Moreover, the steel balls 70, having been shown as an example of an expander medium, have the essential characteristics and advantages of a fluid expander without involving the exacting task of sealing the same against leakage.

In accordance with the present invention, the opposite sides 110 of the jaws 26, reduced as they are in wall thickness and, hence, weakened thereat by the longitudinal bores 50 in the tubular collet wall 40 (Figs. 2 and 6), are kept out of pressure-transmitting relation with the adjacent steel balls 70 so that these weakened jaw sides will not break off when the collet exerts a gripping force of even exceptional magnitude on the work W. To this end, the inner cylindrical surface 72 of the tubular collet wall 40 is along each inner crack 48 therein recessed or depressed as at 114 (Fig. 7) so that on operation of the expander 60 most of the steel balls 70 of the before-described single row in the collet will evenly expand the jaws 26, but those steel balls, designated 70', which align with the depressions 114 have some play between the latter and the frusto-conical surface 68 of the expander 60 and, hence, will not transmit any outward pressure to the weakened jaw sides 110. In view of the foregoing, it becomes obvious that a single row of steel balls 70 in the collet is imperative for the protection of the weakened jaw sides 110 by the expediency of depressing the inner surface of the tubular collet wall thereat. The longitudinal depressions 114 in the inner surface 72 of the tubular collet wall 40 may be ground or otherwise machined thereinto, and they may be of narrow width. Preferably, the depressions 114 are concave in cross-section (Fig. 7), and they will assuredly prevent the adjacent steel balls 70' from exerting any outward pressure on the weakened jaw sides even if these depressions are very shallow.

While in the instant chuck the depressions 114 are provided in the inner surface 72 of the tubular collet wall 40, it is fully within the purview of the present invention to provide these depressions, not in the tubular collet wall but instead in the frusto-conical surface 68 of the expander 60, in which case it will merely be necessary to align the depressions with the weakened jaw sides 110 and retain them in alignment therewith.

Fig. 8 shows a modified collet chuck 120 which differs from the previously described collet chuck 20 primarily by having been the inner cylindrical surface 122 of the tubular collet wall 124 several spaced single rows of steel balls 126, in this instance two rows 128 and 130, and a different expansion mechanism 132. The body 134 of the instant collet 136 is conveniently bolted at 138 to the chuck body 140 and the latter is conveniently bolted at 142 to the power spindle 144 of a lathe or other machine tool. In order to reduce the thickness of the tubular collet wall 124 at the places at which the same is to be cracked for the formation of the jaws 144, the inner cylindrical surface 122 of this tubular collet wall is provided with equiangularly spaced V-shaped grooves 146 (Fig. 9). These grooves 146 stop short of the outer cylindrical periphery 148 of the tubular collet wall 124 to leave minimum wall thicknesses 150 thereat which are subsequently cracked at 152 substantially along rectilinear lines to form the jaws 144.

The expansion mechanism 132 comprises, in the present instance, an end disc 154 and an expander 156. The end disc 154 is provided with a shank 158 on which the expander 156 is axially floatable. The tubular collet wall 124 is at its forward end provided with an annular recess 160 (Fig. 8) in which the end disc 154 is fittedly received with its periphery to prevent chips or other foreign matter from entering the interior of the collet and interfering with the proper operation of the expansion mechanism 132 therein. The expander 156 is tapered at 162 and 164 at its opposite end faces 166 and 168, respectively, for cooperation with the steel balls 126 in the rows 128 and 130, respectively. The steel balls in the row 128 are interposed between the inner surface 122 of the tubular collet wall 124, the tapered surface 162 of the expander 156 and the adjacent inner face of the end disc 154, while the steel balls in the opposite row 130 are interposed between the inner surface 122 of the tubular collet wall 124, the tapered surface 164 of the expander 156 and the adjacent end surface 170 of an insert 172 in the tubular collet wall 124. The tubular collet wall 124 is at the end of each V-shaped groove 146 therein provided with a transverse hole 174 which prevents the spread of the cracks 152 into the collet body 134. The insert 172 in the tubular collet wall 124 serves to locate the steel balls in the row 130 well within the confines of the exemplary work W', while permitting the jaws 144 to extend rearwardly much closer to the collet body 134. A ring 176, bolted or otherwise secured at 178 to the collet body 134, is in covering relation with the transverse holes 174 in the tubular collet wall 124 to prevent the passage therethrough into the interior of the collet of chips or other foreign matter. The end disc 154 is connected at 180 with a rod 182 which, in turn, is operatively connected at 184 with a drawbar 186 in the hollow power spindle 144.

In operation, the exemplary work W' is placed on the non-expanded jaws 144 of the collet 136 with the outer flange 188 of the work bearing against angularly spaced rest pins 190 on the chuck body 140. Next, the end disc 154 is, by means of the drawbar 186, moved slightly to the left as viewed in Fig. 8, until the axially floating expander 156 on the shank 158 of the end disc will at its identically tapered surfaces 162 and 164 exert on the steel balls in the rows 128 and 130, respectively, equal outward forces of sufficient magnitude for the even expansion of the jaws 144 into firm gripping engagement with the work W'. Conversely, the expander 156 will, on movement to the right as viewed in Fig. 8, permit the steel balls 126 to move inwardly and the jaws 144 to contract for the release of the work W' from the collet. In order to induce at all times free axial floatability of the expander 156 on the shank 158 of the end disc 154 and compel the expander to exert uniform outward pressure on the steel balls in both rows 128 and 130, the expander 156 carries a spring-urged plunger or ball 192 which bears against the adjacent face of the end disc 154.

While the V-shaped grooves 146 in the inner surface 122 of the tubular collet wall 124 do not appreciably weaken the opposite sides of the jaws 144, they are, in accordance with the present invention, nevertheless kept out of pressure-transmitting relation with the adjacent steel balls in both rows 128 and 130 so that none of the steel balls may wedge its way into any of the V-shaped grooves 146 and interfere with the proper expansion of the jaws. To this end, the inner surface 122 of the tubular collet wall 124 is along the V-shaped grooves 146 therein provided with relatively shallow depressions 194 which are preferably of limited width and concave in cross section as shown in Fig. 9. Thus, while most of the steel balls 126 in both rows 128 and 130 exert uniform outward pressure on the jaws 144 for their uniform expansion into gripping engagement with the work W', those steel balls 126' which are in registry with the V-shaped grooves 146 in the tubular collet wall 124 have sufficient play between the latter and the expander 156 to prevent them from transmitting any outward pressure to the jaws 144.

While the modified collet chuck 120 just described has only two single rows of steel balls in its collet, the further modified collet chuck of Fig. 9A shows a construction in which more than two spaced single rows of steel balls 126' may be provided in the collet 136' for greater gripping action by the jaws 144' thereof over a larger work area, for instance. Thus, instead of having a single expander as in the previously described collet chuck 120, there are interposed in the present collet chuck between the end disc 154' and the insert 172' several expanders 200, in this instance three, each of which is provided at one side thereof with a frusto-conical surface 202 for reaction with the steel balls 126' in spaced single rows 204, 206 and 208, respectively. By providing the innermost expander 200' with another frusto-conical surface 210 on its opposite side and slightly spacing the same from the adjacent insert 172', another single row 212 of steel balls 126' may be provided in the collet. The expanders 200 are axially floatable on a drawbar extension 214 with which the end disc 154' is operatively connected at 216. Thus, on moving the end disc 154' to the left as shown in Fig. 9A by means of the drawbar extension 214, the frusto-conical surfaces on the several expanders 200 will exert uniform outward pressure on the steel balls 126' in the adjacent rows for the even expansion of the jaws 144'. As in the previously described collet chuck 120, the inner surface 122' of the instant tubular collet wall 124' is along the V-shaped grooves 146' therein provided with shallow depressions which are arranged like the depressions 194 in Fig. 9. The depressions in the instant collet serve to prevent any one of the steel balls 126' in any row from wedging its way into any of the V-shaped grooves 146' and interfering with the proper performance of the collet.

Fig. 10 shows a part of another modified chuck the collet 220 of which employs steel balls 222 that are disposed in side-by-side arranged single rows r for optimum work-gripping performance of the jaws 224 of the collet. To this end, the inner surface 226 of the tubular collet wall 228 is made frusto-conical, and the tubular collet wall 228 is, in the present instance, provided in its outer cylindrical surface 230 with longitudinally extending V-shaped grooves 232 at the places where cracks are to be formed for the formation of the jaws 224 (see also Fig. 11). The V-shaped grooves 232 extend only part-way into the tubular collet wall 228 so as to leave reduced wall thicknesses 236 thereat which are subsequently cracked at 238 in a well controlled fashion for the formation of the jaws 224. To carry the control over the cracking of the reduced wall thicknesses 236 of the tubular collet wall 228 further by preventing the spread of the cracks 238 into the collet body 240, the tubular collet wall 228 is at the inner ends of the V-shaped grooves 232 therein provided with transverse holes 242, respectively, at which the cracks 238 assuredly terminate (Fig. 10). In order that the reduced wall thicknesses 236 of the tubular collet wall 228 may, despite the frusto-conical formation of the inner surface 226 thereof, be of the same thickness throughout for their easiest and most controlled cracking, the V-shaped grooves 232 are of gradually varying depths throughout as shown in Fig. 10. The side-by-side arranged ball rows r are interposed between the inner frusto-conical surface 226 of the tubular collet wall 228 and a frusto-conical expander 244, and the steel balls are confined in the collet by spaced collars 246 and 248 on the expander 244. Movement of the expander 244 to the left as viewed in Fig. 10 will result in outward motion of the mass of steel balls 222 for the expansion of the jaws 224 into firm gripping engagement with work W''. Conversely, slight motion of the expander 244 to the right as viewed in Fig. 10 will relieve the steel balls 222 of their outward pressure and permit the jaws 224 to contract for the release of the work W'' therefrom. As in the case of the previously described collet chucks, the tubular wall 228 of the collet 220 of the instant chuck is in its inner frusto-conical surface 226 provided along the cracks 238 with relatively shallow depressions 250 (Figs. 10 and 11) which prevent any adjacent steel balls 222 from exerting outward pressure on the weakened sides 252 of the jaws 224.

Fig. 12 shows a part of another modified collet chuck construction which is similar to that of Fig. 10, but in which the jaws 224' of the collet 220' are formed by outer and inner longitudinal cracks 254 and 256, respectively, in the tubular collet wall 228'. To this end, the tubular collet wall 228' is at the places to be cracked provided with longitudinal bores 258 which extend to transverse bores 260 to prevent the spread of the cracks 254 and 256 into the collet body 240'. The bores 258 in the tubular collet wall 228' may extend parallel to the adjacent inner frusto-conical surface 226' thereof, so that the inner cracks 256 will be of uniform depth throughout, while the outer cracks 254 will be of varying depths. As in the case of the previously described collet chucks, the inner surface 226' of the tubular collet wall 228' of the instant chuck is along the inner cracks 256 provided with shallow depressions 262.

While each of the previously described collet chucks relies on a single layer of steel balls between collet and expander and on shallow depressions in the inner surface of the tubular collet wall along the adjacent sides of adjacent jaws in order to prevent the steel balls from damaging jaws with weakened sides or wedging their way between adjacent jaws, the modified collet chuck 270 in Fig. 13 accomplishes the same, yet many have superposed layers of steel balls between collet and expander. The instant collet chuck 270 has a body 272 which is conveniently bolted at 274 to the power spindle 276 of a lathe or other machine tool. Formed integrally with the body 272 is a tubular collet wall 278 which is in its inner cylindrical surface 280 provided with generally V-shaped grooves 282 (see also Figs. 14 and 15) that leave the tubular collet wall 278 with reduced wall thicknesses 284 which are subsequently cracked at 286 for the formation of the jaws 288.

The expansion mechanism 290 comprises an expander 292 which has an end flange 294 slidably received in the tubular collet wall 278, and further has a frusto-conical portion 296 and a cylindrical portion 298 with a threaded shank 300 which is operatively connected with a drawbar 302 in the hollow power spindle 276. Confined in the tubular collet wall 278 between a ring-shaped insert 304 therein and the end flange 294 of the expander 292 is a mass of steel balls 306 which, as shown in Figs. 13 and 15, form more than a single layer of steel balls between collet and expander.

In accordance with the present invention, the steel balls 306 are prevented from wedging their way into the V-shaped grooves 282 by radial shielding ribs 308 in the interior of the tubular collet wall 278. The shielding ribs 308, which are in this instance formed integrally with the ring insert 304, extend in the present instance into the V-shaped grooves 282 so as to remain in permanent alignment therewith and hold the steel balls 306 away therefrom. However, it is obvious that the shielding ribs 308 need not extend into the V-shaped grooves 282 and that they will effectively keep the steel balls 306 away therefrom as long as they are aligned with these grooves and may even be spaced therefrom as long as they leave gaps too small for any of the steel balls to reach any of these grooves. Preferably, the shielding ribs 308 extend to the expander 292, and they may even extend into longitudinal grooves 310 in the frusto-conical portion 296 thereof, in order to prevent any of the steel balls 306 from getting underneath any of the shielding ribs 308 and exerting outward pressure thereon. Since the shielding ribs 308 act as partitions which divide the interior of the tubular collet wall 278 into equal compartments 312 (Fig. 15), the number of steel balls 306 in each compartment 312 must be alike for even expansion of the jaws 288, as will be readily understood.

While the instant collet chuck 270 shows the expediency of using shielding ribs for keeping steel balls from the V-shaped grooves in the inner surface of the tubular collet wall so as not to impair the proper performance of the collet at any time, it is, of course, fully within the purview of the present invention to use the instant shielding ribs in any of the previously described collet chucks and dispense with the shallow depressions in the inner surfaces of the tubular collet walls along the adjacent sides of adjacent jaws.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A collet chuck, comprising a collet having a tubular wall part with an annular inner surface and being provided with peripherally spaced cracks of substantial axial extent dividing said wall part into expansible jaws; an expander part encompassed by said tubular wall part and having an annular outer surface conforming, in a plane perpendicular to the collet axis, to the cross-sectional contour of said inner tubular wall surface, at least one of said surfaces being inclined axially on the collet; and a single uninterrupted layer of identical steel balls confined between and engageable with the inner and outer surfaces of said wall and expander parts, respectively, upon axial movement of said expander part in one direction relative to said wall part; one of said parts having formed, in its said annular surface, depressions coinciding with and extending throughout the longitudinal extent of said cracks in said tubular wall part to keep said steel balls out of pressure transmitting relation with the edges of the jaws formed by said cracks.

2. A collet chuck as defined in claim 1, wherein said depressions are formed in said annular inner surface of said tubular wall part.

3. A collet chuck, comprising a collet having a peripheral wall portion provided with an annular inner surface and peripherally spaced, longitudinally extending, wall-reducing recesses and gapless radial cracks leading to said recesses and cooperating therewith to divide said wall portion into a series of expansible jaws; an expander member encompassed by said wall portion and having an annular outer surface conforming, in a plane perpendicular to the collet axis, to the cross-sectional contour of said annular inner surface of said wall portion and disposed adjacent thereto; at least one of said adjacent wall and expander surfaces being inclined axially of the collet; and a single layer of steel balls confined between said surfaces; said expander member being axially movable relative to said peripheral wall portion to wedge said balls between said adjacent surfaces and expand said jaws; one of said adjacent surfaces being formed to provide depressions coinciding with and extending throughout the longitudinal extent of said gapless cracks in said peripheral wall portion to keep said steel balls out of pressure transmitting relation with the edges of the jaws formed by said cracks.

4. A collet chuck as defined in claim 3, wherein said depressions are formed in said annular surface of said peripheral wall portion.

5. A collet chuck as set forth in claim 4, in which said depressions in the inner surfaces of said wall parts are shallow and of concave cross-section throughout.

6. A collet chuck as set forth in claim 4, in which said wall-reducing recesses in said peripheral wall portion are outwardly spaced from the inner surface of the latter and said cracks extend radially to said inner depressed surfaces of said wall portion, respectively.

7. A collet chuck as set forth in claim 4, in which said wall-reducing recesses in said peripheral wall portion are cross-sectionally V-shaped grooves in said inner depressed surfaces of said wall portion, respectively, and said cracks extend radially outwardly from the bottoms of said grooves.

8. A collet chuck as set forth in claim 4, in which said wall-reducing recesses in said peripheral wall portion are longitudinal bores therein, and said cracks are inner and outer cracks formed substantially in the smallest remaining wall thicknesses along said bores with the inner cracks extending radially to said inner depressed surfaces of said wall portion, respectively.

9. A collet chuck as set forth in claim 4, in which the inner surface of said tubular wall portion is cylindrical, said expander member is frusto-conical and longitudinally movable in one direction to force said steel balls outwardly for the expansion of said jaws, and said steel balls are arranged in a single row surrounding said expander and are held between said tubular wall portion and said expander against movement with the latter in said one direction.

10. A collet chuck as set forth in claim 4, in which the inner surface of said wall portion is frusto-conical, said expander is frusto-conical and longitudinally movable in one direction to force said steel balls to expand said jaws, and said steel balls are disposed in side-by-side arranged single rows surrounding said expander.

11. A collet chuck, comprising a collet having a tubular wall portion with an inner frusto-conical surface, said tubular wall portion being provided in peripherally spaced wall parts thereof with outer longitudinal V-shaped grooves and gapless longitudinal cracks extending from the bottoms of said grooves to said inner frusto-conical surface and dividing said tubular wall portion into expansible jaws, and said grooves being of gradually varying depths throughout so that said cracks are of uniform depths throughout; a frusto-conical expander longitudinally movable in said tubular wall portion; and steel balls disposed in side-by-side arranged single rows surrounding said expander and interposed between the latter and said inner frusto-conical surface of said tubular wall portion, said steel balls being adapted to be outwardly forced to expand said jaws on movement of said expander in one direction, and the inner surfaces of said wall parts being depressed to keep said steel balls out of pressure-transmitting relation with the edges of the jaws adjacent to said cracks.

12. A collet chuck, comprising a collet having a tubular wall portion with a bottom and an inner cylindrical surface, said tubular wall portion being provided in peripherally spaced wall parts thereof with longitudinal wall-reducing recesses and longitudinal gapless cracks leading to said recesses, respectively, and dividing said tubular wall portion into expansible jaws; expanders independently longitudinally movable in said tubular wall portion and spaced end-to-end from each other, at least one of the opposing faces of each adjacent expanders being inclined axially of the collet; single rows of steel balls interposed between the inner face of said tubular wall portion and said opposing faces of adjacent expanders, respectively; and means for forcing the end expander most remote from the bottom of said tubular wall portion toward said bottom, thereby causing all expanders to move into positions in which to force said balls uniformly outwardly for expanding said jaws, and the inner surfaces of said wall parts being depressed adjacent to and throughout the longitudinal extent of said cracks to keep said steel balls out of pressure-transmitting relation with said jaws at said cracks.

13. A collet chuck as set forth in claim 12, in which the other end expander has another axially inclined face opposing the bottom of said tubular wall portion, and there is provided another single row of steel balls interposed between the inner surface of said tubular wall portion, the bottom of the latter and said other inclined face of said other end expander.

References Cited in the file of this patent

UNITED STATES PATENTS

| | | |
|---|---|---|
| 1,464,551 | Urquhart | Aug. 14, 1923 |
| 1,548,730 | Mirfield | Aug. 4, 1925 |
| 1,611,122 | Mirfield | Dec. 14, 1926 |
| 1,664,062 | Cone | Mar. 27, 1928 |
| 2,134,749 | Burt | Nov. 1, 1938 |
| 2,139,733 | Deerig | Dec. 13, 1938 |
| 2,153,035 | Burt | Apr. 4, 1939 |
| 2,293,085 | Stieber | Aug. 18, 1942 |
| 2,499,781 | Rothenberger | Mar. 7, 1950 |

FOREIGN PATENTS

| | | |
|---|---|---|
| 548,690 | Great Britain | Oct. 20, 1942 |